Figure 8:
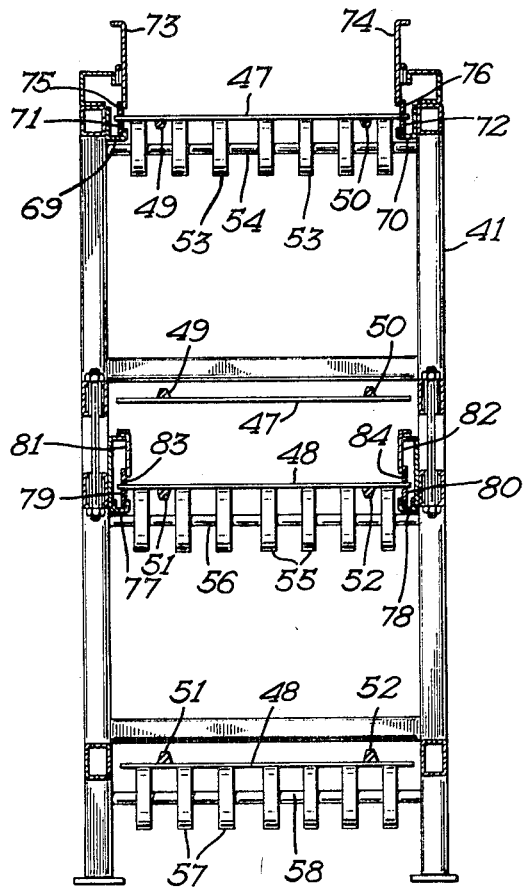

United States Patent

Budahn

[15] 3,636,630
[45] Jan. 25, 1972

[54] METHODS AND APPARATUS FOR CONTINUOUS MANUFACTURE OF CHEESE

[72] Inventor: Burnell E. Budahn, Norwood, Minn. 55368

[22] Filed: Aug. 11, 1970

[21] Appl. No.: 62,999

Related U.S. Application Data

[63] Continuation of Ser. No. 676,397, Oct. 19, 1967, abandoned.

[52] U.S. Cl. .......................................... 31/89, 31/46
[51] Int. Cl. .............................................. A01j 25/00
[58] Field of Search .................... 31/46, 48, 89; 99/116, 243

[56] References Cited

UNITED STATES PATENTS

| | | | |
|---|---|---|---|
| 2,846,767 | 8/1958 | Hensgen et al. | 31/48 |
| 2,907,109 | 10/1958 | Palmer | 31/46 X |
| 2,917,827 | 12/1959 | Lankford | 31/46 |
| 2,980,538 | 4/1961 | Wolf | 31/46 X |
| 3,060,575 | 10/1962 | Czulak | 31/46 X |
| 3,078,169 | 2/1963 | McCadam | 99/116 |
| 3,154,002 | 10/1964 | Budahn | 31/46 X |
| 3,445,241 | 5/1969 | Pontecorvo et al. | 99/116 |

Primary Examiner—Hugh R. Chamblee
Attorney—Schroeder, Siegfried & Ryan

[57] ABSTRACT

Disclosed herein are methods and apparatus for the continuous, completely automated manufacture of cheese from curd to hooping stage which provides an inclined, continuous stainless steel perforated conveyor to separate the whey from the curd and deposits the curd upon an imperforate stainless steel belt matting conveyor. The curd is forced initially into narrower transverse dimensions and thereafter permitted to expand laterally to facilitate the escape of whey while moving on the matting conveyor. When the matting process is essentially half completed, the curd mat is transferred to a second and similar belt conveyor running in the opposite direction and in so doing, is inverted. Live steam is applied to the matting curd as it moves along the matting conveyors within their housings. An automated guillotine knife cuts the curd mat vertically into inch slabs at the end of the matting conveyor and another conveyor moves the slabs into a milling machine which cuts the curd into 1 inch cubes from whence it is conveyed into an inclined, open-ended tumbling drum along with a proportionate amount of salt. As the salted curd leaves the drum, it is deposited in hoops for subsequent pressing and aging.

39 Claims, 9 Drawing Figures

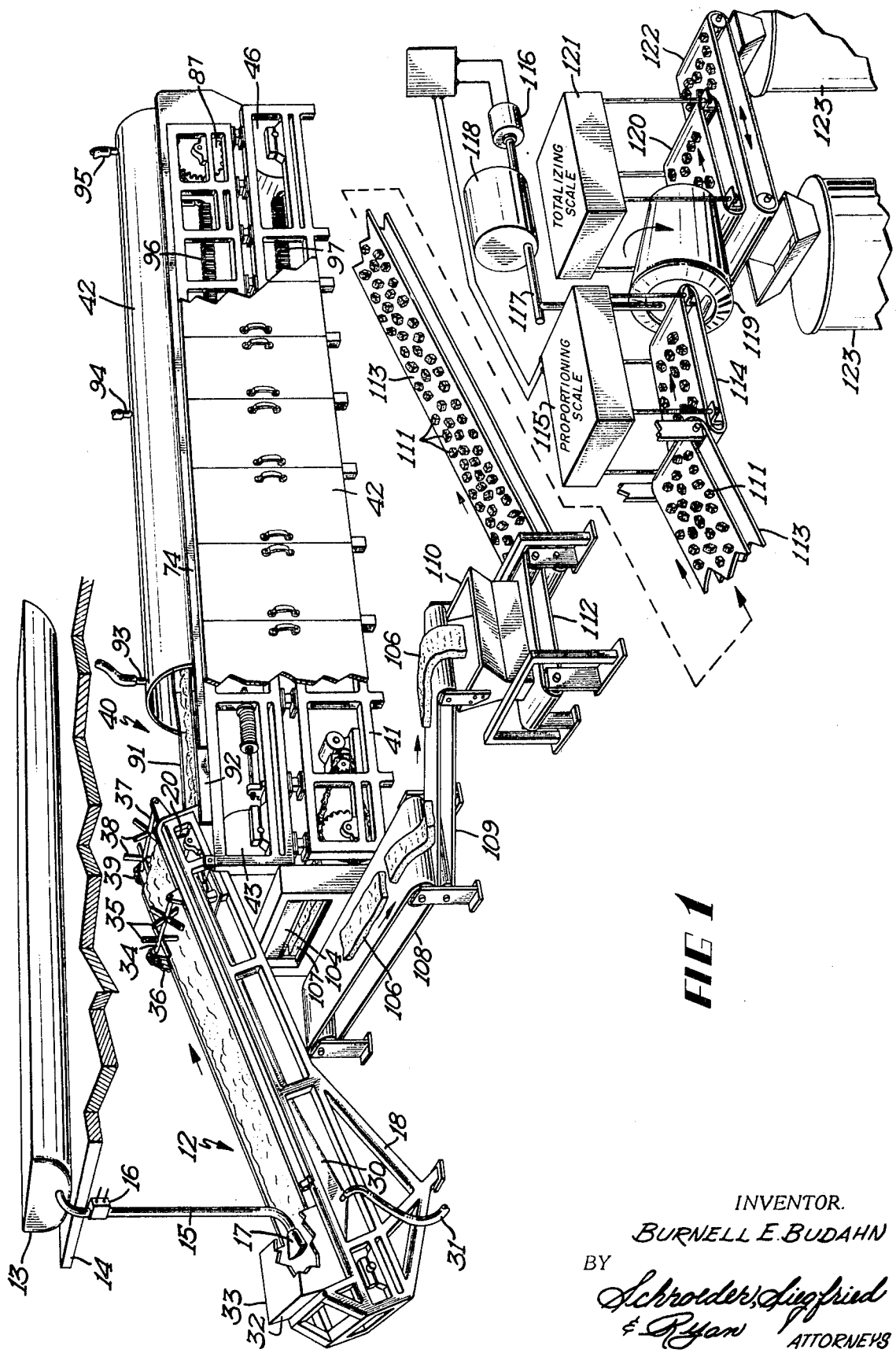

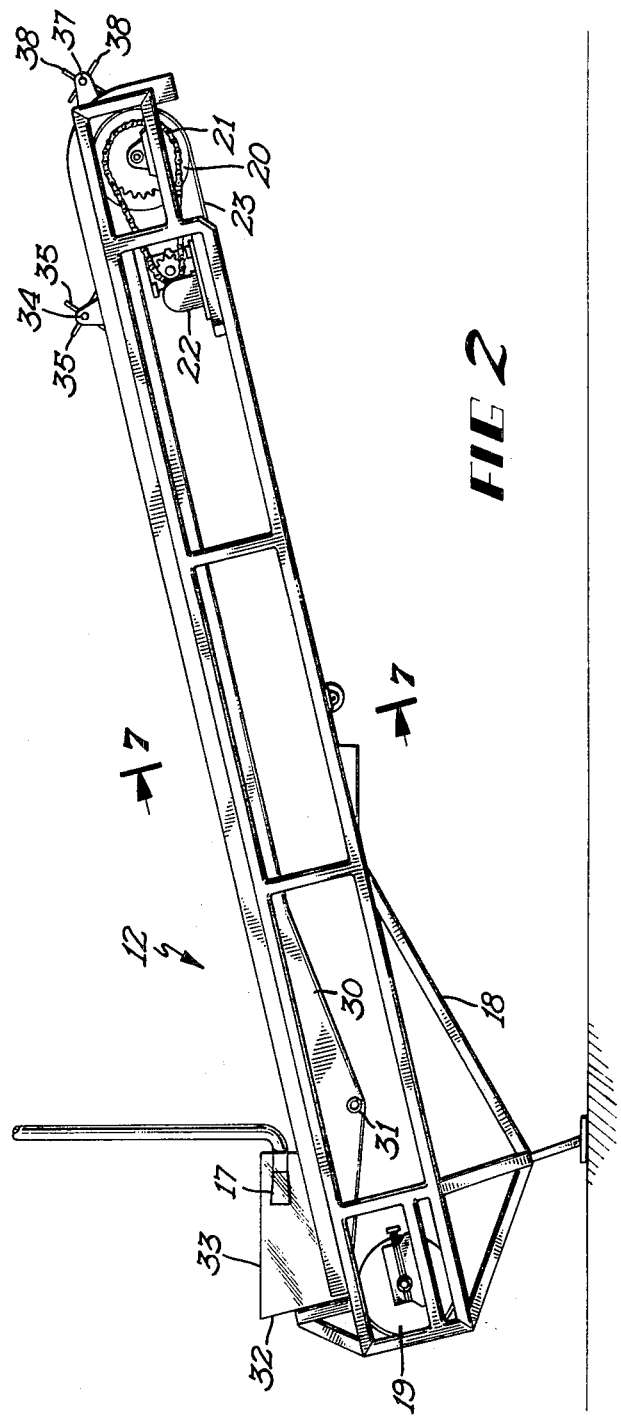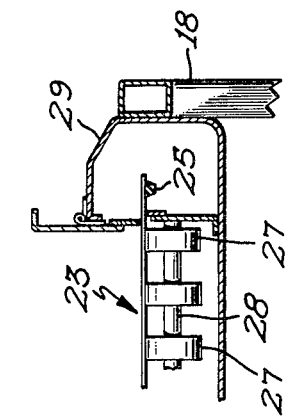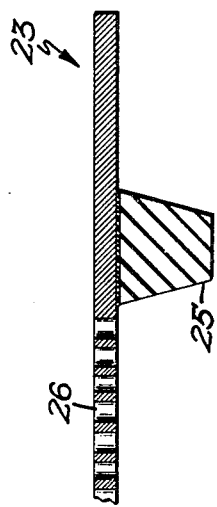

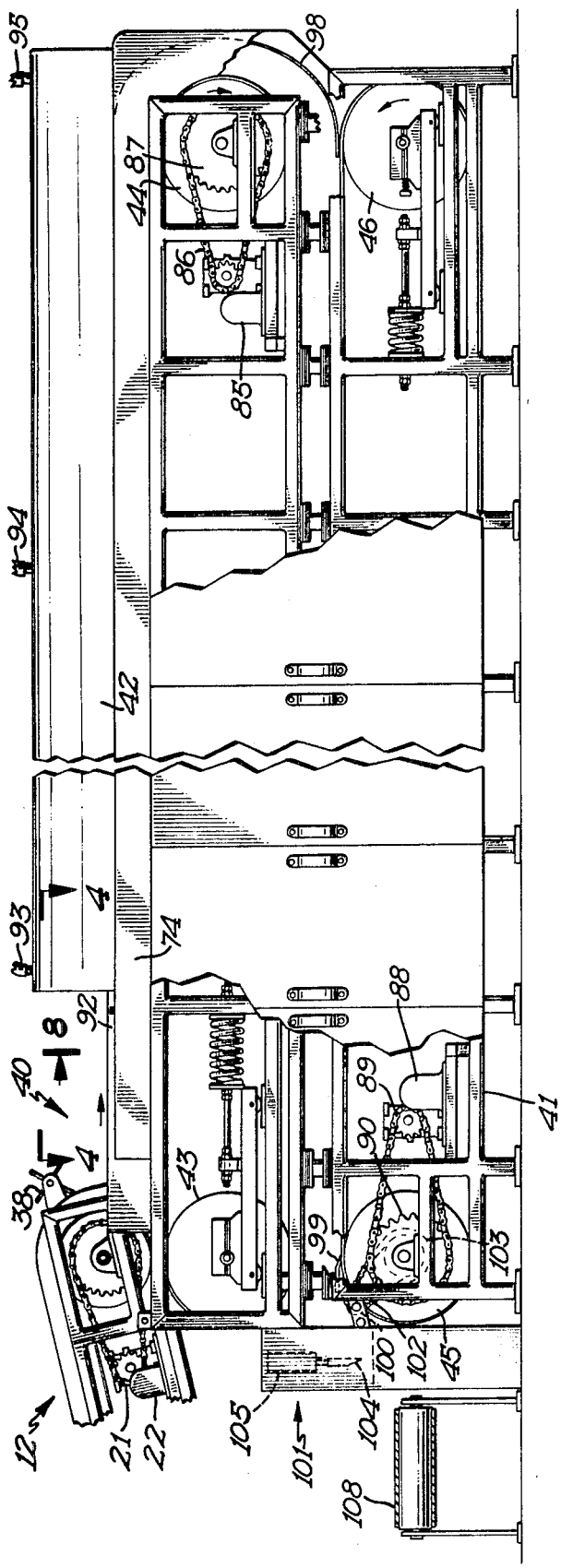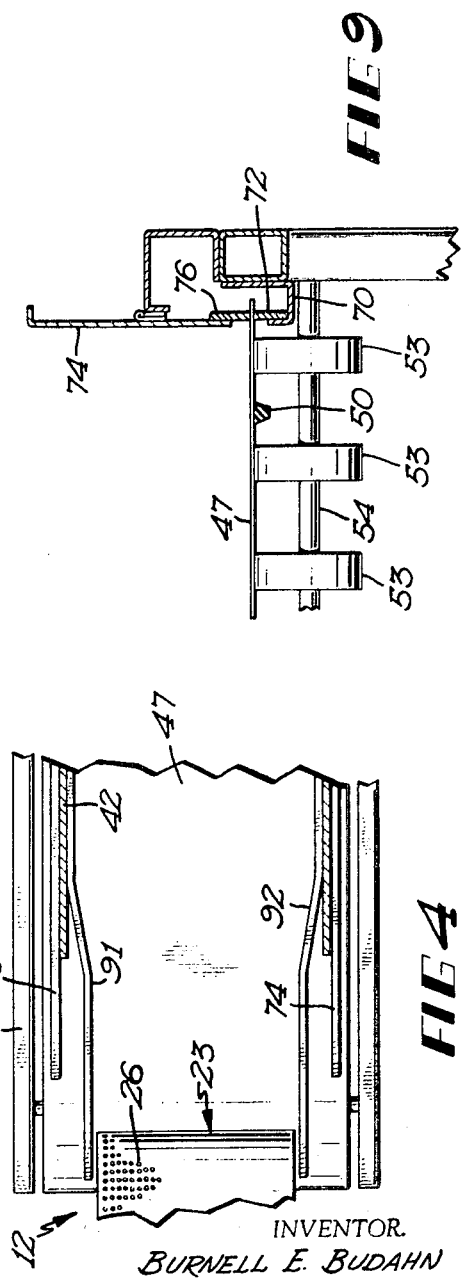

INVENTOR.
BURNELL E. BUDAHN

METHODS AND APPARATUS FOR CONTINUOUS MANUFACTURE OF CHEESE

This is a continuation of application Ser. No. 676,397, now abandoned.

This invention relates to cheesemaking. More particularly it relates to methods and apparatus for use in the continuous, automated manufacture of cheese, commencing with the curd slurry and terminating upon hooping of the matted and salted curd preparatory to pressing.

It is a general object of my invention to provide novel and improved methods and apparatus for the manufacture of cheese in a continuous manner from the curd and whey stage to the final hooping stage.

It is a more specific object of my invention to provide novel and improved methods and apparatus for the continuous manufacture of cheese which will eliminate substantially 75 percent of the labor involved in the manufacturing process from the curd and whey stage to the final hooping stage.

Another object is to provide novel and improved methods and apparatus for the manufacture of cheese in a continuous manner which will provide better control over the moisture content and provide a more uniform end product.

Another object is to provide novel and improved methods and apparatus for the continuous manufacture of cheese which will substantially double the cheese plant capacity over methods and apparatus heretofore known, or, in the alternative, will reduce the running time of the plant in half.

Another object is to provide novel and improved methods and apparatus for the continuous manufacture of cheese which will reduce the space and equipment requirements of the cheese plant.

Another object is to provide novel and improved methods and apparatus for the continuous manufacture of cheese which will increase the yield of cheese provided from a given amount of milk and will eliminate or greatly reduce the waste normally attendant to cheese making in accordance with the methods and apparatus heretofore known.

Another object is to provide novel and improved methods and apparatus for the continuous manufacture of cheese which will substantially increase the sanitation of the cheese manufacturing operation.

Another object is to provide novel and improved methods and apparatus for the continuous manufacture of cheese which will eliminate the guess work by employees and the failure of the employees to perform the prescribed operations at the right time and in the correct manner.

Another object is to provide novel and improved methods and apparatus for the continuous manufacture of cheese which will permit the operator to vary the acidity and moisture content of the end product as desired.

Another object is to provide novel and improved methods and apparatus for separating the whey from the curd of the curd slurry in an improved and efficient manner.

Figure 7:
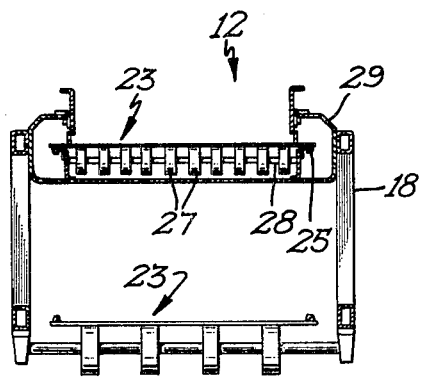

These and other objects and advantages of my invention will more fully appear from the following description, made in connection with the accompanying drawings, wherein like reference characters refer to the same or similar parts throughout the several views, and in which:

FIG. 1 is a perspective view of the continuous cheese making apparatus in operation, with portions thereof broken away to better illustrate its construction and method of operation, FIG. 2 is a side elevational view of the curd separating conveyor shown on an enlarged scale, FIG. 3 is a side elevational view on an enlarged scale of the matting conveyors with portions of the housing broken away to better illustrate the construction and operation thereof, FIG. 4 is a fragmentary plan view taken along line 4—4 of FIG. 3, FIG. 5 is a fragmentary vertical sectional view on a greatly enlarged scale taken through the perforated conveyor utilized in the structure shown in FIG. 2, FIG. 6 is a fragmentary vertical sectional view on a somewhat enlarged scale taken through the edge portions of the perforated conveyor utilized in the structure shown in FIG. 2, FIG. 7 is a vertical sectional view taken along line 7—7 of FIG. 2, FIG. 8 is a vertical sectional view taken along line 8—8 of FIG. 3, and FIG. 9 is a fragmentary vertical sectional view taken on an enlarged scale through the edge portions of the upper rung of the upper matting conveyor shown in FIG. 8.

The preferred embodiment of my invention includes, as shown in FIGS. 1-9, curd and whey separating apparatus, indicated generally by the numeral 12, which receives the curd and whey from vat 13 disposed above the ceiling 14 through a conduit 15. An electrically controlled valve 16 is disposed within the conduit 15 to control the flow of curd and whey therethrough which is ejected through a wide flat nozzle member 17. As best shown in FIG. 1, this wide flat nozzle member 17 has narrow vertical dimensions and relatively wide horizontal dimensions. In operation, the extent to which the valve 16 is opened is regulated in accordance with the nature of the slurry of curd and whey which passes through the conduit 15, the valve being more open when the whey content is higher and more restricted when the curd content is higher.

The curd and whey separating apparatus 12 includes a frame 18 supported at its lower end on the floor and a pair of rollers 19 and 20, one each of which is rotatably mounted at the lower and upper ends of the frame. The roller 20 is driven through a chain 21 by a variable speed motor and gear unit 22. The roller 19 is freely rotatable. Together the two rollers support a perforated stainless steel belt conveyor 23. This stainless steel belt conveyor has a thickness of approximately 0.024 inch and the perforations have a preferred diameter of 0.026 inch and are disposed 0.042 inch from center to center throughout all but the very marginal portions of the belt. The percentage of open area provided by the perforations is preferably at 30–35 percent. A minimum of approximately 25 percent of open area is required in order to properly provide for an adequate escape of the whey during the travel of the curd across the length of the conveyor 12. The size of the perforations may range between 0.5–1.5 millimeters in diameter but I have found that excellent results are obtained when the preferred dimensions and center-to-center distances described above are utilized.

Rubber guide ribs 24 and 25 are vulcanized to the underside of the stainless steel belt 23 adjacent the edge portions thereof as best shown in FIGS. 6 and 9. These guide ribs 24 and 25 are tapered in cross-sectional configuration as illustrated and, in general, have a cross-sectional configuration similar to that which is commonly known as a V-belt. The perforations 26 of the belt are also illustrated in FIG. 6. The guide ribs extend throughout the length of the conveyor 23 and extend into annular grooves formed in the surface of the rollers 19 and 20 adjacent each of their ends. These guide ribs aid in driving the conveyor belt 23 and also in keeping it aligned on the rollers. A plurality of idler rollers 27 which are rotatably mounted on a shaft such as 28 on the frame 18 support the conveyor belt 23 at various points along its length as best shown in FIG. 9. It will be noted that similar idler rollers are utilized to support the lower rung of the conveyor 23 although, of course, fewer are required because only the upper rung of the conveyor carries a load.

Disposed beneath the upper rung of the conveyor belt 23 is a drain pan 29. As shown, this drain pan is mounted upon the frame 18 and extends the length of the conveyor belt and is positioned so as to collect the whey which passes through the conveyor belt 23 so that it may be subsequently dried and utilized as whey powder. The drain pan 29 deepens at its lower end as at 30 and a discharge conduit 31 is provided to lead the collected whey away for storage and subsequent treatment.

Mounted at the lower end of the conveyor belt 23 and immediately thereabove is an upright splashboard 32. A plastic housing 33 is connected to this splashboard and extends forwardly therefrom to surround the discharge nozzle 17 through which the curd and whey are directed to the left as viewed in FIG. 2 in a direction opposite to that in which the upper rung of the conveyor belt 23 moves. This housing 32 has sidewalls and a top wall so that the whey and curd will not splash onto the floor. It will be noted that the nozzle 17 is directed against the splashboard 32 and discharges thereagainst so as to permit the curd to descend therealong into a pool which is formed at the lower end of the conveyor and which permits the curd to settle upon the conveyor belt 23 and be carried upwardly therewith as the whey commences to drain through the perforations of the belt.

Rotatably mounted above the upper end portion of the conveyor 23 upon the frame 18 is a shaft 34 which carries a plurality of agitator arms 35 that extend radially therefrom. The shaft 34 is driven by a chain 36 which in turn is driven by the roller 20 by conventional spur-drive means.

At the upper end of the conveyor 23 a shaft 37 is rotatably mounted on the frame 18 and carries a plurality of agitator arms 38. The shaft 37 is driven by a chain 39 which in turn is also driven by the roller 20 through conventional means. The agitator arms 35 and 37 are each positioned to engage the curd as they rotate in the direction indicated by the arrows in FIG. 1 and to break up the curd so as to facilitate the escape of whey therefrom. It will be understood that it is a natural phenomena of curd when it is ready for matting to have a portion of the whey collect therewithin in pockets which may prevent the escape of the whey unless the pocket is properly broken by agitation, compression or otherwise. These agitator arms function to facilitate the escape of whey from the curd before it is discharged from the conveyor belt 23 upon the continuous matting apparatus which has been identified generally by the numeral 40.

The upper end of the curd and whey separating apparatus 12 is supported upon one end of the curd-matting apparatus 40 as best shown in FIG. 1 in order to facilitate the transfer of the curd from the whey-separating apparatus to the curd-matting apparatus. This curd-matting apparatus 40 includes an elongated rigid frame 41 which has its major portion encased by a housing 42. Rotatably mounted at each end of the frame 41 in the upper portion thereof is one of a pair of rollers 43 and 44 of very large diameter. A second pair of similar rollers 45 and 46 are rotatably mounted in a corresponding manner in the lower portion of the frame 41, one at each end and directly below one of the pair of rollers 43 and 44. Extending around the rollers 43 and 44 is a stainless steel imperforate conveyor belt 47, the upper rung of which travels in the direction of the arrow indicated in FIG. 3. Extending around the rollers 45 and 46 is a second stainless steel imperforate conveyor belt 48, the upper rung of which travels in the opposite direction so that as the curd is received from the whey-separating apparatus 12, it is carried to the right to the far end of the frame 41 as viewed in FIG. 3 and is then returned to the extreme left of the view upon the lower conveyor belt 48 to be cut into slabs by the guillotine knife as will be hereinafter described.

The length of each of the imperforate conveyor belts 47 and 48 is approximately 100 feet, each rung being approximately 50 feet in length. Each of these conveyor belts is approximately 40 inches wide and has a thickness of approximately 0.024 inch. The inclined perforated belt 23, on the other hand, is approximately 48 feet long and 24 inches in width (24 feet long, center shaft to center shaft).

A pair of rubber guide ribs 49 and 50 is vulcanized to the underside of the conveyor 47 adjacent its edge portions and extends throughout the length of the belt. These ribs travel within annular grooves of equal dimensions and configuration formed within the rollers 43 and 44 and aid in driving and maintaining the conveyor belt 47 in aligned relation with the rollers 43 and 44. The location and configuration of these guide ribs can best be seen by reference to FIG. 9. It will be noted that each is located adjacent the edge portions of the conveyor belt. A similar pair of guide ribs 51 and 52 extends longitudinally of the lower conveyor belt 48 and is vulcanized to the underside of that belt and extends throughout the length thereof similarly to the ribs 49 and 50. These ribs 51 and 52 likewise travel within annular grooves formed in the end portions of the rollers 45 and 46 to aid in driving the conveyor belt 48 and in maintaining it in aligned relation with the rollers supporting the same.

A plurality of sets of idler rollers 53 are rotatably mounted for free rotation on a shaft 54 which is carried by the frame 41 directly below the upper rung of the conveyor belt 47. These idler rollers are spaced along the length of the conveyor belt 47 at positions and with sufficient frequency to adequately support the load of curd upon the upper surface of the conveyor belt of as it moves along its path of travel. A similar set of a plurality of idler rollers 55 are mounted for free rotation on a shaft 56 that is carried by the frame 41 directly below the upper rung of the conveyor belt 48 to similarly support the load of curd thereupon. These rollers 55 are similarly spaced along the length of the conveyor belt 48 to adequately support the load of curd as required. A plurality of sets of idler rollers 57 mounted on a shaft such as 58 which is supported by the frame 41 immediately below the lower rung of the conveyor belt 48 are likewise spaced along the length of the lower rung to support the conveyor although, of course, fewer sets of such idler rollers are required because of the fact that the lower rung carries no load. Similar sets of idler rollers 57 are likewise mounted upon the frame 41 directly below the lower rung of the conveyor 47 to likewise support it during its return travel.

Drain troughs 69 and 70 are attached to the frame 41 at each side thereof in position to extend beneath the edges of the upper rung of the conveyor belt 47 and to extend throughout the length of the upper rung of this conveyor belt. Each of these drain troughs 69 and 70 has an upstanding flange such as 71 and 72 formed of plastic and mounted on the troughs in position so that the upper edge thereof is disposed beneath the edge portions of the upper rung of the conveyor belt 47 so as to permit whey to escape laterally from the conveyor belt into the trough without spilling and to support the lateral edge portions of the conveyor. Sideboards or skirts 73 and 74 are likewise supported by the frame 41 as best shown in FIG. 9 and extend throughout the length of the conveyor 47. These skirts extend within the housing 42 and serve to confine the curd, if necessary, from undue lateral expansion. A plastic flange 75 is carried at the lower edge of the skirt 73 as is a plastic flange 76 at the lower edge of the skirt 74 and these flanges likewise extend throughout the length of the conveyor belt 47 to prevent the escape of small chunks of curd with the whey as it moves laterally into the troughs 69 and 70.

Similar drain troughs 77 and 78 are carried by the frame 41 and extend throughout the length of the upper rung of the conveyor 48. The trough 77 has a similar upstanding plastic flange 79 and the trough 78 has a corresponding upstanding plastic flange 80, each constructed similarly and performing functions similar to the flanges 71 and 72. Likewise, sideboards or skirts 81 and 82 are provided to perform functions similar to the skirts 73 and 74 and each carries a depending plastic flange such as 83 and 84 which are constructed similarly and perform functions similar to the flanges 75 and 76. All of the elements 69–84 extend throughout the length of the respective conveyors 47 and 48.

The upper conveyor or matting belt 47 is driven by a variable speed electric motor and drive unit 85 which is connected by a chain 86 to a spur 87 mounted on one end of the roller 44 as best shown in FIG. 3. The lower matting conveyor 48 is similarly driven by a variable speed electric motor and drive unit 88 which is connected by a chain 89 to a spur 90 mounted on the end of the drive roller 45. Each of the matting conveyors 47 and 48 is driven at the same horizontal speed as is the perforated conveyor 23 so that the curd will move throughout the system at a uniform speed of travel.

The rate of travel of the conveyors 47 and 48 is preferably 1–3 feet per minute, depending upon the desired moisture content and acidity of the end product. The preferred matting time is 1 hour and 10 minutes which means that the matting conveyors 47 and 48 are driven at approximately 17 inches per minute. If a cheese having a high-moisture content is desired, the speed of the matting conveyors can be accelerated so as to complete one revolution of travel in 35 minutes but when a cheese having a lower moisture content and consequently a higher quality is desired, 70 minutes matting time is preferred. Through the use of the variable speed electric motor and drive units 85 and 88, an end product cheese having the desired moisture content can be obtained through simple adjustment and this end product will be uniform because each portion of the curd will be matted and drained at the exact equal amount of time. Since the development of acidity within the cheese is a function of the matting time, an end product cheese can be produced having any desired acidity simply by modifying the rate of travel of the conveyors 47 and 48 through adjustment of the drives 85 and 88.

Mounted upon the frame 41 and extending upwardly therefrom adjacent the upper end of the whey separating apparatus 12 at opposite sides of the matting conveyor 47 is a pair of confining skirts 91 and 92. These skirts are relatively high and confine the curd as it is deposited upon the upper rung of the conveyor 47 therebetween. They are spaced apart a distance slightly more than the width of the conveyor 23. The function of these confining skirts 91 and 92 is to confine the curd in a relatively narrow space during the very initial stages of matting so as to permit the curd to commence to knit during which pockets of whey tend to form within the curd. After the curd has passed beyond the confining skirts 91 and 92, it enters the housing 42 and passes between the sideboards or skirts 73 and 74 which are spaced a distance of approximately 36 inches. Thus the curd is permitted to expand laterally as it moves into the area between the sideboards or skirts 73 and 74 with the result that the pockets of whey which have tended to form therewithin tend to be broken and the whey is permitted to escape. I have found that this facilitates the escape of whey in the matting process. The housing 42 is provided with three live steam inlets 93, 94 and 95 through which live steam is introduced and directed toward the curd as it is passing along through the housing 42. The live steam serves to maintain the temperature and moisture content of the curd at the desired temperature level which is approximately 100° F. Steam is released slowly so as to avoid undue heat and the separation of butterfat from the curd. In addition, mounted beneath the upper rung of the conveyor 47 is a series of heating fins 96. Mounted below the upper rung of the conveyor 48 is another set of heating fins 97. These fins also provide heat which aid in maintaining the temperature of the curd while it is going through the matting phase.

Mounted at the far end of the frame 41 (to the right as viewed in FIG. 1) opposite the drive roller 44 is a concavely shaped inverter plate 98. This inverter plate 98 is an arcuately shaped plate of stainless steel shaped to conform to the radius of curvature of the roller 44 and somewhat removed from the outer surface thereof a sufficient distance to permit the mat of curd to pass therealong downwardly as indicated by the arrows in FIG. 3 and to invert the mat so that as it is deposited upon the matting conveyor 48, the portion of the mat which was uppermost as it moved along the matting conveyor 47 will rest upon the matting conveyor 48 and the lower portion of the mat as it moved along with conveyor 47 will be uppermost as the mat moves along conveyor 48. Thus the mat of curd is inverted automatically as its direction of movement is changed with the result that the curd will be uniform in texture and will mat properly to form a cheese having the desired qualities and characteristics. Since the lower portion of the mat of curd is always subject to more weight than the upper portion, the desired pressing function is obtained by the inversion of the mat so that the curd will knead properly and the whey will escape to the desired extent.

As the mat of curd reaches the end of its travel along the lower matting conveyor 48, it engages a wedge-shaped blade 99 which is positioned immediately above the upper surface of the matting conveyor 48 above the driving roller 45 to cause the mat to be transferred onto a short driven conveyor 100. The blade 99 extends across the width of the lower conveyor 48, of course, and merely serves to aid in transferring the mat onto the powered conveyor 100 to carry the same into the path of the guillotine-type cutting device indicated by the numeral 101. The conveyor 100 is driven through a chain 102 which passes around a spur gear 103 mounted on the end of the driven roller 45.

The cutting device 101 includes a guillotine-type blade 104 which is moved vertically at regular periodic intervals by means of an air cylinder such as indicated by the numeral 105 at each of its ends. The movement and control of the blade 104 and the cylinders 105 is correlated with the rate of movement of the conveyors 47 and 48 so that the blade is moved downwardly and returned at such regular intervals as to cut a slab of curd such as indicated by the number 106 which is 1 inch thick. As the blade 104 descends, a certain amount of additional whey escapes from the compressing effect of the blade as well as the rupturing of any pockets of whey which remain within the mat 107 of curd at the end of the matting operation.

The slabs 106 of curd severed by the guillotine blade 104 drop down upon a powered conveyor 108 which carries the slabs of curd as shown to a second inclined conveyor 109 which deposits the slabs as best shown in FIG. 1 into the receiving hopper of a curd milling machine 110 of the conventional type. The curd milling machine 110 cuts the slabs of curd into 1-inch cubes 111 and deposits them upon the conveyor 112 which is disposed immediately below the milling machine to receive them and to transfer them onto another inclined driven conveyor 113. This conveyor 113 carries the milled curd onto a horizontal conveyor 114 which is supported by the platform of a proportioning scale 115.

The proportioning scale 115, as shown, is a scale which, while supporting the conveyor 114, senses the load of material on the belt. With the required delivery rate known, the conveyor is sized accordingly and driven by a synchronous speed motor of known r.p.m. Thus, by computation, the maximum weight of the material on the belt is determined. The scale which is shown and utilized is scale Model M-18X(2) which can be obtained from Thayer Scale Company, Pembroke, Massachusetts. This scale utilizes a linear voltage differential transformer and has its armature attached to the weigh-beam which emits a signal voltage of 0.9 to 2.7 volts for armature displacement of 0.1 inch. To confine the armature displacement to 0.1 inch, on "iso-elastic spring" is attached to the weigh-beam and the displacement of the spring is proportional to the applied load. The scale linear voltage differential transformer voltage signal is applied to a voltage-to-current converter which produces a 10 to 50 milliamp signal for control of a DC motor 116. The DC motor is attached to a variable speed transmission which drives a screw conveyor 117 which passes through a supply drum 118 of salt to feed salt at the desired rates. Thus, as the load of curd on the scale conveyor changes, the scale linear voltage differential transformer output signal will change, resulting in a comparable change in the speed of the DC motor 116 driving the salt feeder 117 to maintain the desired ratio of salt to cheese. The desired ratio is 2.5–3 percent by weight of salt to cheese curd.

In lieu of the proportioning scale 115, the salting mechanism described and utilized in the continuous cheese-manufacturing apparatus disclosed and claimed in my copending patent application Ser. No. 399,232, filed by me on Sept. 25, 1964 and entitled "Continuous Cheese Manufacturing Apparatus" may be used. Either of these mechanisms will add the correct amount of salt proportionately to the flow of milled cheese curd so that the correct proportions of salt and curd will enter the tumbling drum 119.

The tumbling drum 119 is identical to that disclosed and claimed in my copending application referred to above, Ser. No. 399,232. It is driven in a similar manner and steam is released therewithin beneath the curd in the same manner as described in said application so that by the time the milled curd tumbles from the lower end of the inclined tumbling drum 119, it is salted uniformly and maintained at the proper temperature for subsequent hooping and pressing.

As the curd tumbles from the tumbling drum 119, it lands upon a conveyor 120 supported by a totalizing scale indicated generally by the numeral 121. This totalizing scale is likewise produced by and can be obtained from Thayer Scale Company, Pembroke, Massachusetts. I utilize their scale Model T-18 which also has an armature of a linear voltage differential transformer attached to the scale weigh-beam to emit a voltage signal proportional to the weight of the material on the scale conveyor. A servosystem is coupled to a Thayer-designed integrator with a rate dial and totalizer so that, dependent upon the signal from the scale linear voltage differential transformer, the servosystem will act on the integrator to variably drive the totalizer and rate dial. The totalizing scale is connected in controlling relation to a reversible conveyor 122 so that the salted and milled curd will run off one end of the conveyor 122 and be deposited within the drum 123 at that end until the required amount of curd has been deposited in the drum and then the conveyor will be automatically reversed in direction so as to fill the drum with the required weight of curd at the opposite end of the conveyor. The drums, of course, are removed manually as they are filled and while the drum of the opposite end of the conveyor is being filled.

In operation, the valve 16 is open to the desired extent to cause the slurry of mixed curd and whey contained within the vat 13 to be discharged from the nozzle 17 against the splashboard 32. It will be understood, of course, that a substantial amount of the whey may have been drawn off the vat 13, if desired, before the curd and whey slurry is introduced onto the conveyor 23. As the curd and whey splashes against the splashboard 32, a pool is formed at the lower end of the conveyor 23 and the curd settles upon the conveyor 23 and moves upwardly therewith as illustrated in FIG. 1, the whey separating therefrom gradually through the perforations 26 and discharging through the conduit 31. By the time the curds have reached the upper end portion of the whey and curd separating apparatus 12, most of the whey has been separated from the curd and the chunks or particles of curd tend to adhere to each other. The agitator blades 35 and 38 agitate and stir the curd so as to facilitate the escape of the whey from the curd so that by far the major portion of the whey has separated from the curd by the time it is deposited from the conveyor 23 upon the imperforate matting conveyor 47.

From the time the curd is deposited by the conveyors 23 upon the matting conveyor 47 until it reaches the housing 42, it is confined by the confining skirts 91 and 92, which, as previously described, are spaced apart a distance only slightly greater than the width of the conveyor belt 23. Thus the curd is confined during the initial matting stages and during that period the curd tends to commence to knead and attendant with such kneading, small pockets of whey may be formed within the body of the curd. As the curd passes the confining skirts 91 and 92, it is no longer confined because the skirts 73 and 74 are considerably more distant from each other with the result that the curd is permitted to expand laterally. This lateral expansion is desirable for it tends to break up any pockets of whey which may have formed within the body of the curd and facilitate the escape of whey laterally into the troughs 69 and 70.

As the matting curd flows through the housing 42, live steam is slowly introduced through the inlets 93, 94 and 95 to aid in maintaining the temperature of the curd at approximately 100° F. and to maintain the moisture content thereof. Heat is simultaneously applied from the fins 96 disposed below the conveyor belt 47 and the curd commences to mat as it moves slowly along with the upper rung of the matting conveyor 47.

When the mat of curd reaches the far end of the matting conveyor 47, it is engaged by the inverting plate 98 which causes the mat of curd to descend as shown by the arrows and follow along the outer surface of the descending upper rung of that conveyor. As it reaches the lower portion of its descent, it is discharged upon the upper surface of the matting conveyor 48 which is traveling in the opposite direction and as a consequence, it moves through the second half of the matting period in inverted relation to its position as it was carried by the upper conveyor 47. Thus the portions of the mat of curd which were previously uppermost are now disposed in the lower portions of the mat and consequently more pressure is applied thereto. The effects of the steam release through the inlets 93-95 and the heat provided by the fins 96 and 97 maintains the temperature and humidity of the matted curd as it moves slowly toward the discharging end of the conveyor 48.

By the time the curd has reached the blade 99, the matting process has been completed and the curd is ready to be milled, salted, and hooped. The blade 99 elevates the mat of curd slightly and transfers it to the driven conveyor 100 which carries the mat through the guillotine-type cutting device 101. The guillotine knife 104 moves vertically at regular intervals correlated with the speed of movement of the conveyors 47 and 48 so as to cut 1-inch slabs 106 of curd from the end of the mat and these slabs are deposited upon the conveyor 108 and transferred thereacross to the conveyor 109 and into the milling machine 110. The milling machine is of the conventional type which cuts the slabs 106 into 1-inch cubes and deposits them upon the conveyor 112 which carries them onto the conveyor 113 and thence to the proportioning scale 115.

The proportioning scale 115 is sensitive to the weight of the curd which moves thereacross and proportions the amount of salt which is discharged into the tumbling drum 119 along with the milled curd so as to provide a cheese end product having the required salt content. The tumbling drum 119 tumbles the curd and salt therewithin as live steam is released beneath the curd so that by the time the curd is deposited upon the conveyor 120 of the totalizing scale 121, the application of salt to the curd is uniform.

As described above, the reversible conveyor 122 carries the milled and salted curd into the hoop or drum 123 until the desired weight has been received therewithin at which time the conveyor reverses its direction and commences to fill the hoop or drum 123 at the opposite end thereof. The milled and salted curd within the hoop 123 is ready for pressing and aging so that the entire cheesemaking operation with the exception of the pressing and aging has been completed.

From the above, it will be seen that I have provided methods and apparatus for the continuous manufacture of cheese from the whey and curd stage to the hooping stage which makes the operation substantially completely automated and thereby substantially eliminates at least 75 percent of the labor normally involved in the manufacture of cheese between the curd and whey stage and the final hooping stage. This substantial saving in labor results in greatly reduced costs of manufacturing of cheese and has proved to be unusually effective and desirable particularly in large-scale operations.

I have also found that if the methods and apparatus disclosed and claimed by me herein are utilized, it is possible to substantially double the capacity of a given cheese plant over the methods and apparatus heretofore known. In the alternative, of course, the running time of the plant can be reduced in half if it is desired to only maintain the production at the previous level.

Through the use of the methods and apparatus described herein, it is possible to produce a cheese end product which is substantially more uniform and therefore more desirable than methods and apparatus heretofore known. In addition, I have found that the quality of the cheese is improved for it is possible for the cheese maker to provide better control over the moisture content of the cheese. Since the moisture content is one of the prime factors considered in grading cheese, this is extremely important. Moreover, it is possible through the use of this apparatus to also more accurately predetermine the acidity which will be found in the end product and since this is highly desirable in the manufacture of cheese, this is an added advantage of my equipment and apparatus. I have found that a cheese having any prescribed acidity can be prepared through the use of these methods and apparatus by the mere adjustment of the rate of movement of the conveyors 23, 47 and 48 by adjusting their respective drive mechanisms.

Another advantage of the methods and apparatus described herein is that substantially less space and equipment is required to operate a cheese plant of a given capacity. In addition, the use of this equipment has been found to increase the yield of cheese obtained from a given amount of milk for it eliminates or greatly reduces waste. This is true because the apparatus and methods defined herein eliminates the guesswork by the employees and also eliminates the failure of the employees to perform the prescribed operations at the correct time and in the correct manner. In other words, it greatly diminishes or substantially eliminates the errors and inconsistencies normally attendant to the manufacture of cheese by the methods and apparatus heretofore known. Also, since the entire operation is conducted without the curd being handled by human hands and through the use of stainless steel conveyor belts, the degree of sanitation attained in the manufacture of the cheese is greatly enhanced.

I have found that with the apparatus and methods defined herein, it is possible to produce 6,000 pounds of cheese per hour and the apparatus can be operated 20–22 hours per day resulting in a total production of 120,000–132,000 pounds of cheese per day. Since the apparatus eliminates spillage, the yield is increased and since it eliminates mechanical errors which result in waste (such as running the matting table over or the improper positioning of screens and matting tables) further waste is eliminated and the yield is increased. Since no matting tables are required, the amount of space and the amount of equipment required is also diminished. It will be readily seen that the entire operation is almost completely automated so that it may be run substantially continuously by a single operator, the only inoperative time being required is that necessary for washing and maintaining the equipment.

It will, of course, be understood that various changes may be made in the form, details, arrangement and proportions of the parts without departing from the scope of this invention which consists of the matter shown and described herein and set forth in the appended claims.

What is claimed is:

1. In the continuous manufacture of cheese, the method of separating the curd from the whey and matting the same, consisting in:
   a. depositing the unmatted raw curd and whey in a layer upon a perforated belt conveyor,
   b. operating the perforated belt conveyor at a speed such that the major portion of the whey will have separated from the curd by the time the curd reaches the end of the perforated belt conveyor,
   c. depositing the separated raw curd from the end of the perforated belt conveyor in a layer upon one end portion of an elongated imperforate belt conveyor,
   d. operating the elongated imperforate belt conveyor at a speed such as to permit the layer of raw curd to meanwhile form a mat thereon while the curd is being carried to the opposite end of that conveyor,
   e. inverting the mat of raw curd when it reaches the end of the elongated belt conveyor and transferring the same in layer form in inverted position upon a second elongated imperforate belt conveyor, and
   f. operating the elongated belt conveyors at a speed such that the raw curd will be sufficiently matted and will have developed the desired acidity by the time it has reached the end of its travel upon the conveyors.

2. The method defined in claim 1 and maintaining the perforated conveyor belt at an incline while it is in operation.

3. The method defined in claim 1 and first restricting the transverse horizontal dimensions of the mat of curd upon the first elongated belt conveyor and then permitting the same to expand such dimensions.

4. The method defined in claim 1 and permitting the mat of curd to expand in its transverse horizontal dimensions during a major portion of its period of movement with the first elongated conveyor.

5. The method defined in claim 1 and operating the second elongated belt conveyor in a direction opposite to that of the first elongated belt conveyor.

6. The method defined in claim 1 and vertically cutting the mat of curd at the end of its travel upon the conveyors into flat elongated slabs adapted for milling.

7. The method defined in claim 1 and agitating the layer of curd into multiple smaller pieces after the major portion of the whey has drained therefrom and before it is deposited upon the first elongated conveyor to facilitate the further escape of whey from the curd while it is matting.

8. The method defined in claim 1 wherein each of the steps thereof is performed continuously.

9. In the manufacture of cheese, the method of automatically matting the raw cheese curd, consisting in:
   a. depositing substantially drained, unmatted raw curd in a layer upon a long, imperforate belt conveyor to form a mat in layer form thereon,
   b. operating the belt conveyor substantially continuously and moving the curd therewith in an uncompressed condition throughout its travel away from the point of deposit to a point of discharge,
   c. inverting the mat of raw curd at the end of the conveyor belt and transferring the same in layer form in inverted position upon a second long, continuously operating belt conveyor, and
   d. operating the conveyors at a speed such that the raw curd will be sufficiently matted for hooping and will have developed the desired acidity by the time it has reached the end of its travel upon the conveyors.

10. The method defined in claim 9 and at first restricting the transverse horizontal dimensions of the mat of raw curd upon the first conveyor and then permitting the same to expand such dimensions while maintaining the temperature of the curd at substantially the same level.

11. The method defined in claim 9 and permitting the mat of raw curd to expand in its transverse horizontal dimensions during a major portion of its period of movement with the first conveyor while maintaining the temperature of the curd at substantially the same level.

12. The method defined in claim 9 and subjecting the raw curd to the release of live steam as it moves with the conveyors.

13. The method defined in claim 9 and operating the second conveyor in a direction opposite to that of the first conveyor.

14. The method defined in claim 9, maintaining the temperature of the curd while on the conveyor at substantially the same level, and cutting the mat of raw curd in a single fixed vertical plane at the end of its travel upon the conveyors into flat elongated slabs adapted for milling.

15. In the manufacture of cheese, the method of automatically separating the unmatted raw curd from the whey preparatory to matting the raw curd, consisting in:
   a. depositing the unmatted raw curd and whey in a predetermined direction into a channel-shaped member having a perforated, continuous conveyor belt extending in a single upwardly inclined plane throughout substantially its entire length for a bottom through which the whey may escape, and
   b. operating the conveyor belt in a direction having a strong directional component opposite to the direction of deposit of the unmatted curd thereon and at a speed such as to bring the raw curd to a matting location after the major portion of the whey has separated from the curd and passed through the perforations of the conveyor belt.

16. The method defined in claim 15 wherein the conveyor belt is maintained at an incline while it is so operated.

17. Apparatus for automatically and continuously conditioning the curd in the continuous manufacture of cheese from mixed curd and whey, consisting of:
   a. a perforated continuous belt conveyor mounted for revolving movement about a pair of spaced axes and having an upper surface moving as said conveyor revolves to receive the curd and whey thereon and separate the two and having discharge and receiving end portions,
   b. drive means connected to said conveyor for operating said conveyor continuously,
   c. continuous belt conveyor means having one end portion positioned adjacent the discharge end of said perforated belt conveyor in receiving relation thereto to receive the separated curd therefrom,
   d. means including a conduit for introducing the mixed curd and whey in controlled relation upon the upper surface of the receiving end portion of said perforated belt conveyor so as to permit the curd to be separated from the whey as it moves to said belt conveyor means,
   e. drive means connected to said continuous conveyor means for operating the same continuously,
   f. the length and speed of movement of said conveyor means being such that the curd will have matted and reached a predetermined acidity by the time it has reached the end of said second conveyor means,
   g. automatic cutter means mounted at the end of said conveyor means in mat-receiving relation therewith and automatically cutting the curd mat into slabs of curd adapted for milling,
   h. power-driven milling means positioned and arranged to receive and cut such slabs of curd into chunks preparatory to salting and hooping of the same,
   i. means for continuously conveying such slabs from said automatic cutter means into said milling means to be milled,
   j. power-driven salting means adapted to continuously receive such milled curd and to proportionately salt and pass the same therethrough,
   k. means for continuously conveying such milled curd from said milling means into said salting means, and
   l. means for continuously directing such salted curd into hoops for subsequent pressing.

18. The structure defined in claim 17 wherein said conveyor belt means is comprised of a pair of vertically spaced, imperforate, stainless steel belts, the first of which discharges onto the second, and
   m. means at the end of said first belt for inverting the mat of curd and depositing the same upon said second belt in inverted position.

19. The structure defined in claim 17 wherein the said drive means for said conveyor and said conveyor means are each adjustable to various speeds as desired.

20. The structure defined in claim 17, and
   m. rotary agitator means mounted in position to engage and agitate the curd upon said perforated conveyor adjacent the discharge end portion thereof.

21. The structure defined in claim 17, and
   m. housing means surrounding said conveyor means, and
   n. means for releasing live steam within said housing means and upon the curd to maintain the temperature and moisture content thereof.

22. The structure defined in claim 17 and
   m. confining means adjacent the discharge end of said perforated conveyor and said conveyor means for laterally confining the curd while initially upon said conveyor means.

23. Apparatus for automatically and continuously conditioning and matting the curd preparatory to milling, in the continuous manufacture of cheese from mixed raw curd and whey, comprising in:
   a. an inclined perforated continuous belt conveyor mounted for revolving movement about a pair of spaced axes and having an upper surface extending and moving upwardly in a single upwardly inclined plane throughout substantially its entire length as said conveyor revolves and having upper and lower end portions,
   b. drive means operatively connected to said conveyor for operating said conveyor continuously,
   c. continuous belt conveyor means having one end portion positioned adjacent the upper end of said perforated belt conveyor in receiving relation thereto to receive the separated raw curd therefrom,
   d. means including a conduit for introducing the mixed raw curd and whey in controlled relation upon the upper surface of the lower end portion of said perforated belt conveyor so as to permit the raw curd to be separated from the whey as it moves upwardly thereon to said second belt conveyor,
   e. drive means operatively connected to said continuous belt conveyor means for operating the same continuously, and
   f. the length and speed of movement of said conveyor means being such that the raw curd will have matted and reached a predetermined, desired acidity by the time it has reached the end of said conveyor means.

24. The structure defined in claim 23, and
   g. enclosure means enclosing a major portion of said conveyor means to aid in maintaining the temperature and moisture content of the curd as it moves along with said conveyor means.

25. The structure defined in claim 23, and
   g. curd agitator means disposed immediately adjacent the upper end portion of said perforated belt conveyor in position to engage and agitate the curd to facilitate the escape of whey from the curd.

26. The structure defined in claim 24, and
   h. live steam discharging means disposed within said enclosure means and discharging live steam therewithin to maintain the moisture content and temperature of the curd.

27. The structure defined in claim 23, and
   g. automatic cutter means mounted at the end of said conveyor means in mat-receiving relation therewith and automatically cutting the curd mat into slabs of curd adapted for milling.

28. The structure defined in claim 23,
   g. each of said drive means being adjustable in speed to permit the same to be controlled as desired in order to vary the matting time and acidity of the matted curd.

29. The structure defined in claim 23,
   g. said conveyor means being of greater horizontal transverse dimensions than said perforated conveyor.

30. The structure defined in claim 23,
   g. said conveyor means including mechanism constructed and arranged to invert the mat of curd formed upon said conveyor means at a position intermediate the ends of the path of travel of the curd mat upon said conveyor means.

31. The structure defined in claim 23, and
   g. confining means carried by said conveyor means and disposed adjacent the upper end of said perforated conveyor and said conveyor means for confining the curd against lateral expansion while it is initially disposed upon said conveyor means.

32. Apparatus for automatically separating the whey from the curd in the manufacture of cheese comprising:
   a. a source of mixed curd and whey prepared for the manufacture of cheese therefrom,
   b. an inclined, perforated, continuous belt conveyor mounted for revolving movement about a pair of spaced axes and having an upper surface moving upwardly as said conveyor revolves and having upper and lower end portions,
   c. means operatively connected to said conveyor for operating the same continuously, d. conduit means connected to said source of curd and whey and extending to said lower end portion of said conveyor for introducing the curd and whey onto the lower end portion of said conveyor in continuous, volume-controlled relation, e. collector means positioned beneath said conveyor in position to collect the whey after it has separated from the curd and passed through the perforations of said conveyor, and f. said conveyor belt being made of stainless steel and having perforations each having a diameter of the order of magnitude of approximately 0.5–1.5 millimeters distributed throughout its surface and defining an open area of no less than approximately 25 percent of the total surface area of said conveyor belt.

33. The structure defined in claim 32 wherein the perforations in said conveyor belt have a diameter of approximately twenty-six one-thousandths of an inch.

34. The structure defined in claim 32 wherein said conduit means has a discharge directing the curd and whey discharged therefrom in a direction opposite to the direction of movement of the upper surface of said conveyor.

35. The structure defined in claim 32, and g. a flow-arresting member positioned above the upper surface of, said conveyor adjacent the lower end of the latter, and h. said conduit means having a discharge directed against said flow-arresting member to cause the curd discharged therefrom to flow against said member and then deposit upon the upper surface of said conveyor and move therewith.

36. The structure defined in claim 32, and g. a curd agitator disposed immediately above the upper end portion of said perforated belt conveyor in position to engage and agitate the curd to facilitate the escape of whey from the curd and through the perforations of said belt conveyor.

37. The structure defined in claim 32, g. said conveyor operating means being adjustable in speed to vary the speed of movement of said conveyor.

38. Apparatus for automatically and continuously conditioning the curd in the continuous manufacture of cheese from mixed curd and whey, consisting of:

a. a perforated continuous belt conveyor mounted for revolving movement about a pair of spaced axes and having an upper surface to receive the curd and whey thereon as said conveyor revolves and to separate the two and having opposite end portions, b. drive means connected to said conveyor for operating said conveyor continuously, c. continuous belt conveyor means having one end portion positioned adjacent one of the end portions of said perforated belt conveyor in receiving relation thereto to receive the separated curd therefrom, d. means including a conduit for introducing the mixed curd and whey in controlled relation upon the upper surface of the opposite end portion of said perforated belt conveyor so as to permit the curd to be separated from the whey as it moves toward said belt conveyor means, e. drive means connected to said continuous conveyor means for operating the same continuously, f. the length and speed of movement of said conveyor means being such that the curd will have matted and reached a predetermined acidity by the time it has reached the end of said second conveyor means, g. automatic cutter means mounted at the end of said conveyor means in mat receiving relation therewith and automatically cutting the curd mat into slabs of curd adapted for milling, h. power-driven milling means positioned and arranged to receive and cut said slabs of curd into chunks preparatory to salting and hooping of the same, i. means for continuously conveying said slabs from said automatic cutter means into said milling means to be milled, j. power-driven salting means adapted to continuously receive such milled curd and to proportionately salt and pass the same therethrough, k. means for continuously conveying such milled curd from said milling means into said salting means, and l. means for continuously directing such salted curd into hoops for subsequent pressing.

39. Apparatus for automatically separating the whey from the curd in the manufacture of cheese comprising:

a. a source of mixed curd and whey prepared for the manufacture of cheese therefrom, b. a perforated continuous belt conveyor mounted for revolving movement about a pair of spaced axes and having an upper surface adapted to support the curd as said conveyor revolves and having opposite end portions, c. means operatively connected to said conveyor for operating the same continuously, d. conduit means connected to said source of curd and whey and extending to one of said end portions of said conveyor for introducing curd and whey thereonto in continuous volume controlled relation, e. collective means positioned beneath said conveyor and positioned to collect the whey after it is separated from the curd and passed through the perforations of said conveyor, and f. said conveyor belt being made of stainless steel and having perforations each having a diameter of the order of magnitude of approximately 0.5–1.5 millimeters distributed throughout its surface and defining an open area of no less than approximately 25 percent of the total surface area of said conveyor belt.

* * * * *